United States Patent
Baker et al.

(10) Patent No.: US 7,190,362 B1
(45) Date of Patent: Mar. 13, 2007

(54) SYSTEM AND METHOD FOR ORGANIZING DATA FOR A 3-DIMENSIONAL GRAPHICS PIPELINE

(76) Inventors: Nicholas Baker, 505 Fern Ridge Ct., Sunnyvale, CA (US) 94087; Mei-Chi Liu, 880 E. Fremont Ave. #518, Sunnyvale, CA (US) 94087; Adrian Sfarti, 1235 Wildwood Ave. #350, Sunnyvale, CA (US) 94089; Paolo Sabella, 3457 Cumberland Gap, Pleasanton, CA (US) 94588

( * ) Notice: Subject to any disclaimer, the term of this patent is extended or adjusted under 35 U.S.C. 154(b) by 1327 days.

(21) Appl. No.: 09/009,714
(22) Filed: Jan. 20, 1998
(51) Int. Cl.
    *G06T 15/00* (2006.01)
(52) U.S. Cl. .................................................... 345/419
(58) Field of Classification Search ............ 345/419, 345/420, 423, 440, 441
    See application file for complete search history.

(56) References Cited

U.S. PATENT DOCUMENTS

| | | | |
|---|---|---|---|
| 5,485,559 A | | 1/1996 | Sakaibara et al. .......... 395/133 |
| 5,896,139 A | * | 4/1999 | Strauss ....................... 345/420 |
| 5,905,502 A | * | 5/1999 | Deering ...................... 345/420 |
| 5,905,507 A | * | 5/1999 | Rossignac et al. .......... 345/440 |

FOREIGN PATENT DOCUMENTS

| | | |
|---|---|---|
| EP | 0 531 157 | 3/1993 |
| EP | 0 757 333 | 2/1997 |
| FR | 2 694 427 | 2/1994 |

* cited by examiner

*Primary Examiner*—Phu K. Nguyen

(57) ABSTRACT

A system and method for pipelining three-dimensional graphical data in which two-dimensional renderings of objects are created from polygon data by transforming and lighting each polygonal vertex and then connecting the vertices.

12 Claims, 5 Drawing Sheets

SYSTEM AND METHOD FOR ORGANIZING DATA FOR A 3-DIMENSIONAL GRAPHICS PIPELINE

FIELD OF THE INVENTION

The invention relates to the rendering of three-dimensional computer images, and specifically to the pipelining of image data for three-dimensional objects.

BACKGROUND OF THE INVENTION

A known method for graphically modeling an object is to approximate the curvature of the object by dividing the object into a series of adjacent strips or fans and then dividing each strip or fan into a series of adjacent triangles whose vertices lay on the edge of the strip or fan. For example, FIG. 1 shows object 100 that has been divided into strips and triangles in accordance with this technique. Strips 101 and 103 are immediately adjacent to one another and define object 100. Each strip is further partitioned into a set of triangles. For example, strip 101 is divided into triangles 115, 125, 135, and so on, while strip 103 is partitioned into triangles 145, 155, 165 and so on. It is noted that the triangles are positioned within a three-dimensional space defined by the object to be rendered. Therefore, the triangles need not reside in the same plane and, indeed, are likely to be non-planar with respect to one another as they are positioned around the three-dimensional object.

Shown in FIG. 2 is a known data structure 200 for storing a strips and fans representation of an object. The triangles of the representation have been deconstructed into a vertex array 210 and an index list 220. Vertex array 210 stores information related to the vertices of the triangles. Specifically, each entry of vertex array 210 contains, among other parameters, the three-dimensional coordinates of a vertex. For example, the three-dimensional coordinates of vertices 116, 118, 120, and 122 are shown as entries in array 210. It is noted that the vertices of an object are ordinarily grouped together, but are in no particular order within the group. For example, in FIG. 2 the order of the entries corresponds to vertices 122, 118, 120, and 116. It is further noted that the coordinates stored in array 210 describe the positioning of the vertices with respect to one another in a three-dimensional space wholly defined by object 100. In other words, the coordinates define only the surface of the object, not the surrounding space.

Index list 220 stores instructions for reconnecting the vertices of the triangles within the strips of object 100. For example, the instructions relating to the reconstruction of triangle 115 are shown in index list 220. Since triangle 115 is considered, in this example, to be the first triangle in strip 101, instructions for this triangle are immediately preceded by a "start strip" instruction. The number of vertices representing a strip is encoded in the respective "start strip" instruction. This is followed by the next three instructions, which correspond to vertices 116, 118, and 120. Each instruction pair 116-118, 118-120, and 120-116, represent a connection between vertices. Thus triangle 115 is reconstructed.

Once the initial triangle in a strip is complete, a degree of efficiency is achieved by the strips and fans method. This is because each remaining triangle within the strip builds upon the preceding triangle and may be defined by reference to one additional vertex. For example, continuing with strip 101, triangle 125 shares vertices 118 and 120 with triangle 115 and may easily be defined with an additional reference to vertex 122. The technique described above capitalizes on this fact by grouping and processing the connections between vertices 118, 120, and 122 as the third through fifth instructions of index list 220. Since vertex 118 and vertex 120 have been connected in the reconstruction of triangle 115, additional connections to vertex 122 need only be made. Triangle 135 and those following in strip 101 are reconstructed in a similar fashion.

As each triangle is being reconstructed, the corresponding vertices must have certain operations performed on them in order to position them properly on the screen. Firstly, each vertex is positioned within a three-dimensional space by a geometric transformation such as a translation, a rotation, a scaling, or a combination of these functions. This transformation is performed in order to track the motions of the object to be rendered. Each vertex then may be optionally lighted before being projected from its three-dimensional space into a two-dimensional perspective. The result of this operation is to project each of the vertices in object 100 onto a flat screen that may then be rendered using a standard rendering pipeline.

Shown in FIG. 3 is a known pipeline system 300 for rendering three-dimensional objects from graphical data stored in a data structure like that shown in FIG. 2. Memory 310 is divided into an input database 311 that includes index list 220 and vertex array 210, and an output database 313 that stores transformed triangles. As described above, vertex array 210 and index list 220 store the graphical data of an object that has been modeled using the strips and fans technique. In response to a command from a user or a software application, geometry processor 320 initiates the rendering of a stored image by entering the corresponding rendering routine. Part of this routine is responsible for collecting all of the input data required to reconstruct each triangle of the object. The input data consists of index list 220, which is referenced via pointer 321, and vertex array 210, which is referenced by pointer 323. At the outset, pointer 321 corresponds to the start of instructions for rendering object 100. As described above, each instruction in the index list is either a start-strip command or an instruction to reference an entry in the vertex array. In response to receiving a start-strip command, processor 320 reads the number of vertices in the strip from the command and enters this number into a count register. It then specifies in a format register whether a strip or a fan is to be rendered, and indicates in a continuation register whether vertices from the last strip are to be carried over into the next. In response to accessing an index instruction in index list 220, processor 320 is instructed to read, via pointer 323, a corresponding vertex-array entry, entry 211 for example. As described above, vertex-array entry 211 stores the three-dimensional coordinates of a triangle vertex. In order to determine the two-dimensional screen coordinates for the vertex, the processor, in accordance with the motions of the object described by the user or the software application, reads and transforms the coordinates from vertex-array entry 211 and lights the vertex in accordance with the lighting, blocking, and shadowing parameters created by other rendered objects within the locale of the vertex in question. The result is to transform the three-dimensional model coordinates into a set of two-dimensional transformed, or screen, coordinates. Once the coordinates of a vertex have been transformed and lighted, the screen coordinates are then used by processor 320 to assemble the respective triangle, which is then stored in output database 313 of memory 310. The triangle is read by renderer 330 as needed and rendered on screen 340, thus producing the screen perspective viewed by the user.

Although the technique and system described above efficiently reconstruct subsequent triangles by building on an initial triangle, this efficiency is limited to the reconstruction of triangles within a strip. For example, with reference to FIG. 1, this can be seen in the reconstruction of triangle 145. Triangle 145 shares vertices 116 and 120 with completed triangle 115 and could easily be reconstructed by further reference to vertex 124. However, the described method builds triangle 145 by reprocessing and reconnecting vertices 116 and 120. These actions are redundant. With respect to the system of FIG. 3, this inefficiency translates into numerous redundancies for processor 320. Processor 320 must twice read, twice transform, and twice light the coordinates of model vertices 116 and 120, as well as twice connect, twice assemble and twice store the connection between these vertices. Thus, as implemented by system 300, this method produces redundancies in the processing of data, resulting in (1) decreased rendering speed due to the increased number of required computation cycles, (2) greater memory requirements due to the storage of assembled triangles which contain redundant data, and (3) inefficient use of the available memory bandwidth due to the passage of redundant data and assembled triangles between elements of the system. Thus a need exists for a method and system for processing index instructions and vertex data in a manner that reduces data redundancies and increases rendering speed.

SUMMARY OF THE INVENTION

A method and system for connecting the vertices of a strips and fans data structure for rendering a three-dimensional object. A processor first generates an output array by transforming and lighting each model vertex in an array of model vertices. A polygon engine then reads a series of instructions from a list of indices, wherein each instruction references a transformed vertex in the output array. The list of indices are ordered such that any ordered pair of indices indicates that a connection should be made between the corresponding transformed vertices stored in the output array.

DETAILED DESCRIPTION

Figure 1:
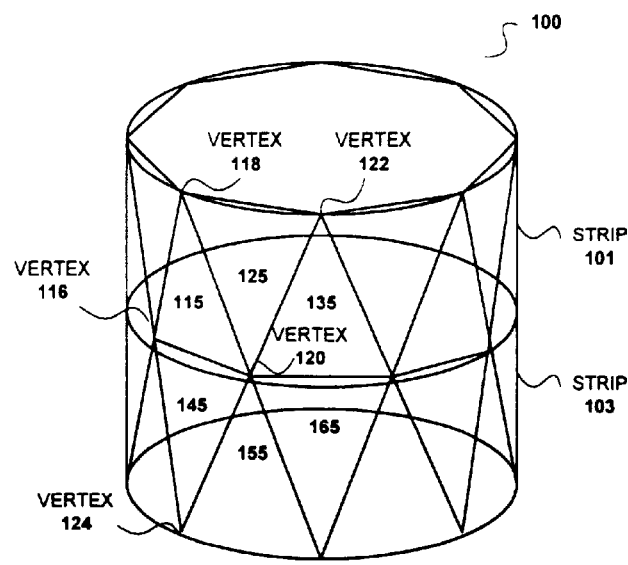
FIG. 1 shows a known technique for graphically describing an object.
Figure 2:
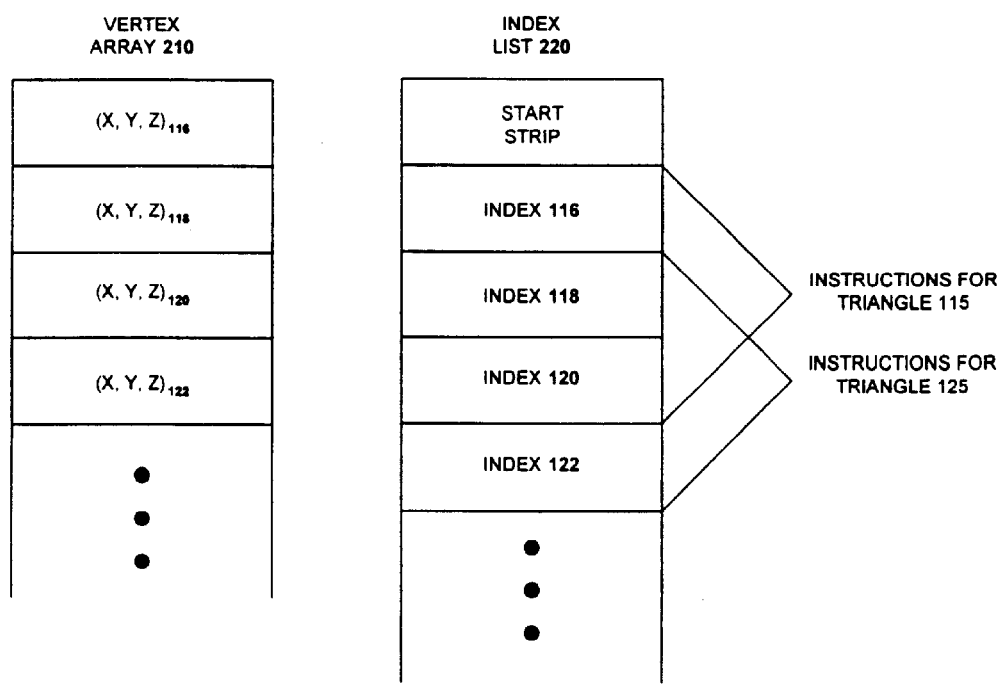
FIG. 2 shows a known data structure for storing graphical information of a known technique for describing an object.
Figure 4:
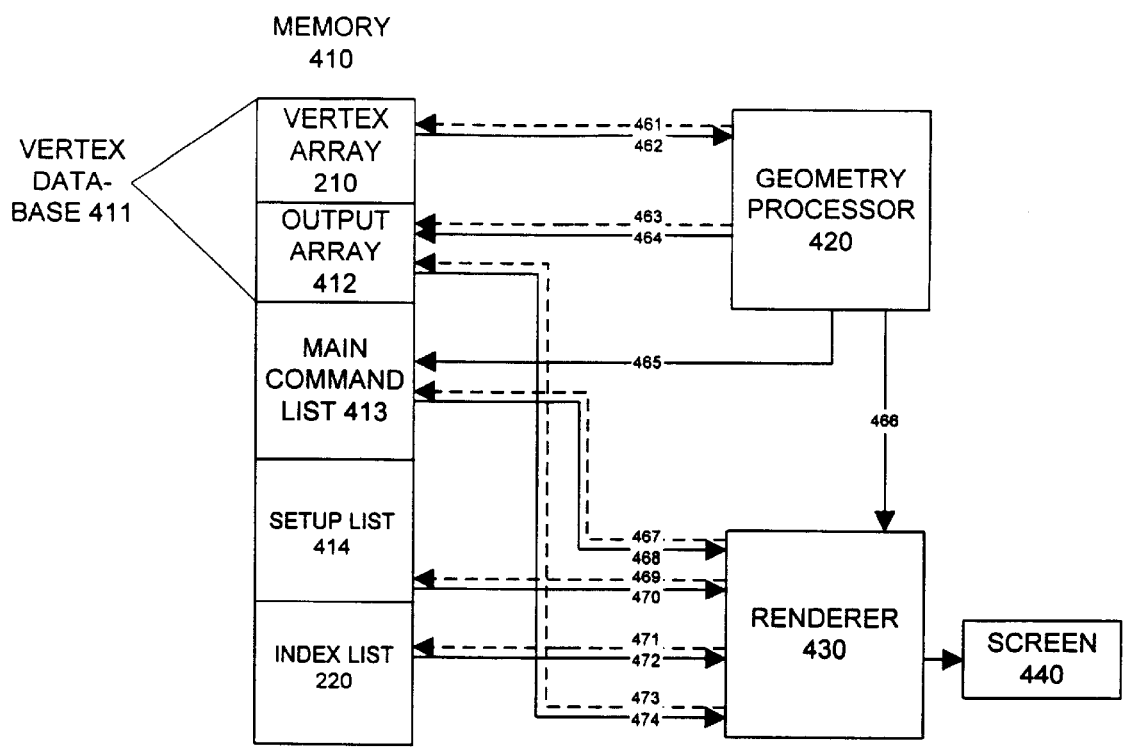
FIG. 4 shows a system in accordance with the present invention for rendering a graphical description of an object.

Shown in FIG. 4 is system 400, an embodiment of the invention. Memory 410 is divided into vertex data base 411, main command list 413, setup list 414, and index list 220. Vertex database 411 is in turn divided into vertex array 210 and output array 412. Vertex array 210 and index list 220 are structured in a manner as described in FIG. 2. It is noted that memory 410 may contain multiple pairs of index lists and vertex arrays, each pair containing information for an image to be rendered.

In response to receiving a command and a vertex count from a user or a software application, processor 420 reads the entry indicated by pointer 461 from vertex array 210. This entry contains either a "start strip" command or an index instruction. A "start strip" command indicates that the processing of the next strip is to be initiated and contains a count value indicating the number of vertices in the strip to be connected. As discussed above, an index instruction points to an entry containing vertex parameters, including the three-dimensional coordinates of a vertex of a triangle used to model the object to be rendered. Upon reading 462 the entry from vertex array 210, processor 420 transforms and lights the vertex in accordance with the motions of the object as defined by the software application or user. For example, if object 100 is an airplane or a portion of an airplane, the software application or user may instruct the image to be rendered frame-by-frame through a dive, a roll, or any other motion made by an airplane. In addition to the motion of the object itself, the transformation and lighting process must take into consideration other objects, such as clouds for example, that affect the appearance of the object to be rendered. The result of these processes is the two-dimensional screen equivalent of the three-dimensionally described vertex. Once the vertex has been transformed and lighted, processor 420 stores the transformed vertex in output array 412 at entry 464 indicated by pointer 463 which is supplied by the application. Processor 420 then increments pointers 461 and 463 and the process repeats with the next vertex-array entry. Thus each vertex-array entry of the object to be rendered is processed. This process continues until the end of vertex array 210 is encountered, indicating that each vertex of the object to be rendered has been transformed and lighted. Note that the end of vertex array 210 is given by the vertex count value.

At the end of processing vertex array 210, processor 420 places three pieces of information in the main command list 413. The first piece of information is a subroutine call that references setup list 414 which contains special instruction for the renderer to initialize datapath modes. The second piece of information is a special instruction indicating an address pointer to the start of output array 412. The third piece of information is a subroutine call to index list 220, which contains instructions for connecting the vertices of the object to be rendered. This process is repeated for each output array that has been readied by processor 420 for rendering by renderer 430, and may result in a lengthy command list 413.

Processor 420 signals renderer 430 over communication line 466 that an output array and an associated index list is ready for rendering. Specifically, processor 420 sends renderer 430 two pointers. The first pointer, a "write pointer", indicates the end of main command list 413, while the second pointer, a "read pointer", indicates the start of the same list. In this manner, processor 420 updates renderer 430 as to the current status of command list 413. Polygon renderer 430 constantly monitors the state of its internal read pointer in relation to the write pointer written above. Whenever these pointers differ, renderer 430 reads instructions from the main command list 413, incrementing the internal read pointer for each instruction.

Continuing with the example, once renderer 430 detects a difference between the read and write pointers, it reads list main command list 413 at 467 and decodes the next three commands. First, renderer 430 processes the subroutine call for setup list 414. Secondly, renderer 430 encounters the start address of outpay array 412. After reading this address, renderer 430 receives the subroutine call to index list 220 at pointer 471. Upon reading the call, renderer 430 jumps to this address and starts processing the instructions comprising index list 220.

As discussed above, each entry in index list 220 is either a "start strip" command or is an instruction to connect the next vertex with the preceding vertex. In this case, once the "start strip" instruction is processed, subsequent instructions reference entries in output array 412. In response to each of the subsequent instructions, renderer 430 reads the corresponding transformed vertex information from output array 412 as indicated by pointer 473. This step is preferably performed by storing in each of the instructions of index list 220 an offset value that, once added to the starting address of output array 412, references the transformed vertex. As renderer 430 assembles each triangle from the transformed vertices of output array 412, the triangles are passed to screen 440 for display. It is noted that index list 220 is processed sequentially, and once the initial setups have taken place, renderer 430 assembles triangles by referencing index list 220 and output array 412.

Figure 3:
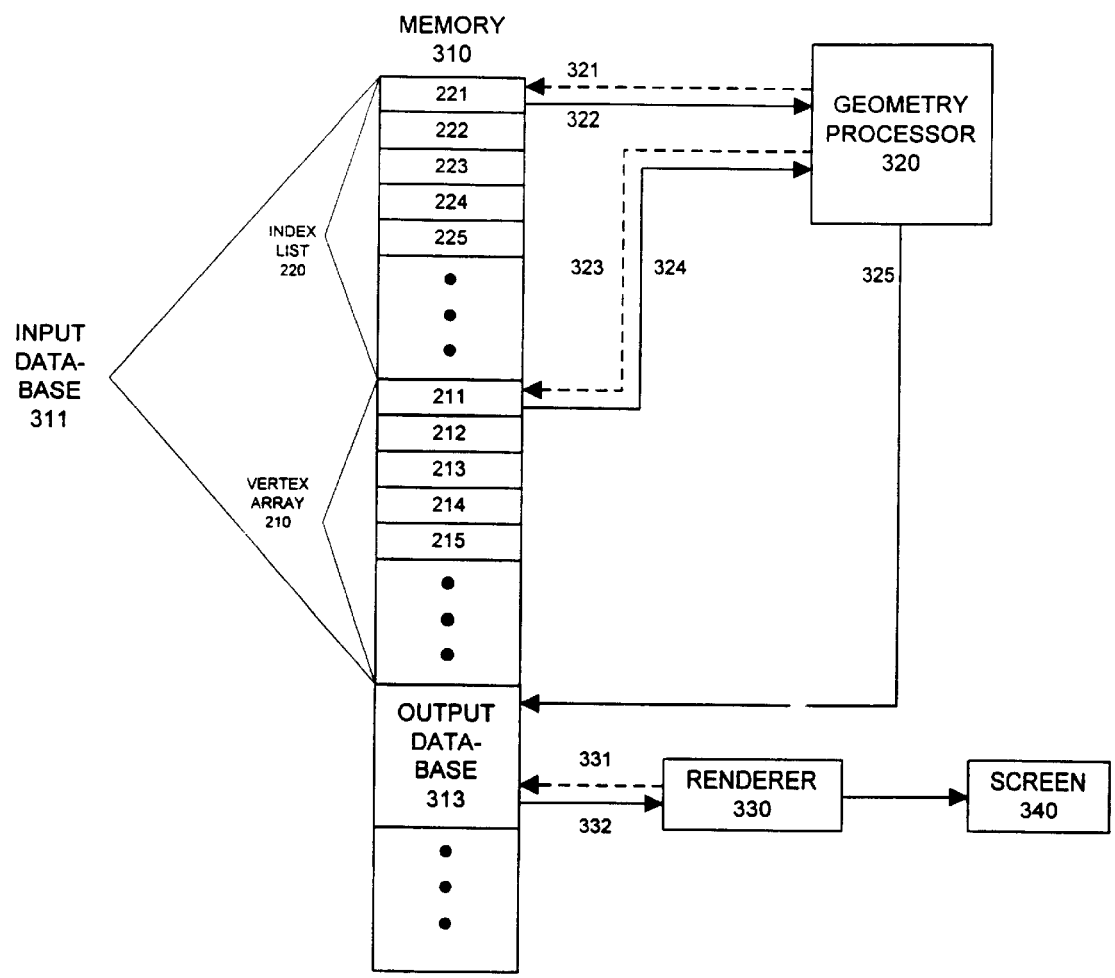
FIG. 3 shows a known system for rendering a graphical description of an object.

The system described above and shown in FIG. 4 places less of a burden on processor 420 than that placed on processor 320 by the known system shown in FIG. 3. This is because processor 420 need only transform and light each vertex once, while processor 320 may be required to repeatedly transform and light the same vertices. This difference is attributed to the slightly increased burden placed on renderer 430, which not only retrieves and sends triangles to a screen as does renderer 330, but must also assemble them from the vertices of output array 412.

Figure 5A:
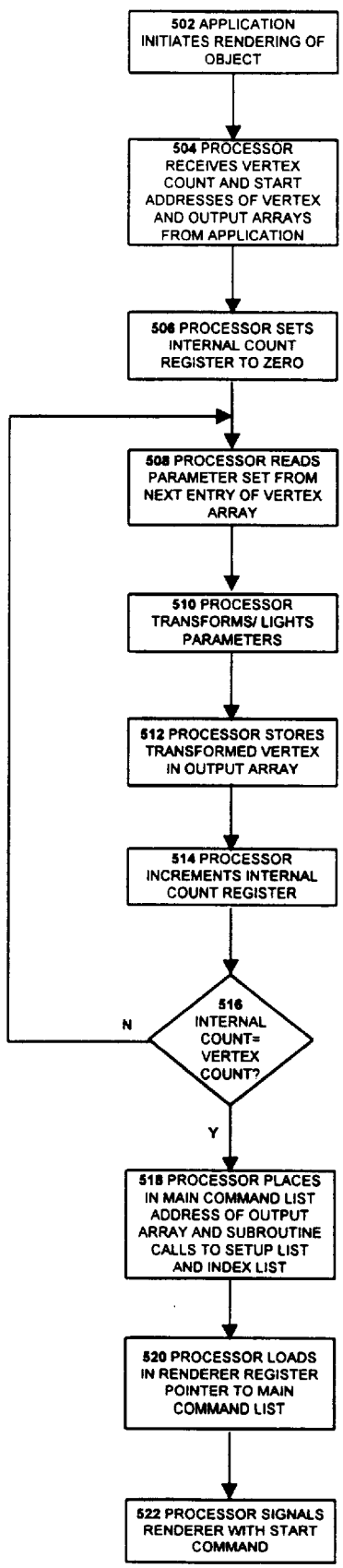
FIGS. 5A and 5B show a flow diagram of a method in accordance with the present invention for rendering a graphical description of an object.

FIG. 5A shows a flow diagram of the role of processor 420 in a method for rendering a three-dimensional graphical image in accordance with the present invention. In step 502, a software application initiates the rendering of an object. Typically, the application is an interactive video game operating on processor 420 and the rendering may be in response to a user's movement of a joy stick, indicating that an object is to be moved and necessitating a refreshed image of the object in the new position. As part of the initiation of the rendering, the application provides processor 420 with two pointers, one to the corresponding vertex array such as array 210, and the second to an output array such as array 412, and a vertex count. The vertex count is indicative of the number of vertices arrayed upon the surface of the object. Processor 420 receives these address pointers and the vertex count in step 504. In step 506, processor 420 sets an internal count register to zero. The count register is used by processor 420 to determine when the last vertex of the object has been processed. In step 508, processor 420 begins to sequentially process the vertices of vertex array 210 by reading the vertex-array entry indicated by the pointer read in step 504. The entry contains the model coordinates of a single vertex of the object. In step 510, the processor transforms and lights the vertex in accordance with the movement of the object as described by the software application. In step 512, the processor stores the transformed coordinates of the vertex in output array 412 located at the address provided by the application in step 504. In step 514, the processor increments the internal count register, indicating that a vertex has been processed. In step 516, the value stored in the internal count register is compared with the vertex count in order to determine whether the last of the entries in vertex array 210 has been processed. If not, the process loops back to step 508 and steps 508 through 516 are repeated for the next entry in array 210. Although processor 420 may process the entries in any manner as long as each entry is processed, it is most efficient for the processor to sequentially process the entries from the start of the array to the end.

In step 518, which is reached once all of the entries in array 210 have been transformed, processor 420 places the starting address of output array 412 in the main command list 413. The main command list stores the starting address or addresses of the output arrays that have been completed by processor 420 and are ready for assembly and rendering. In addition to placing the output array address in the main command list, processor 420 places two subroutine instructions in main command list 413. The first subroutine command instructs renderer 430 to jump to the setup command list 414, while the second subroutine command instructs renderer 430 to jump to the corresponding index list of assembly instructions. Processor 420 completes the processing of the vertices in step 520 by loading in a register of renderer 430 pointer 467 to main command list 413 and, in step 522, by sending renderer 430 a start command over communication line 466.

Figure 5B:
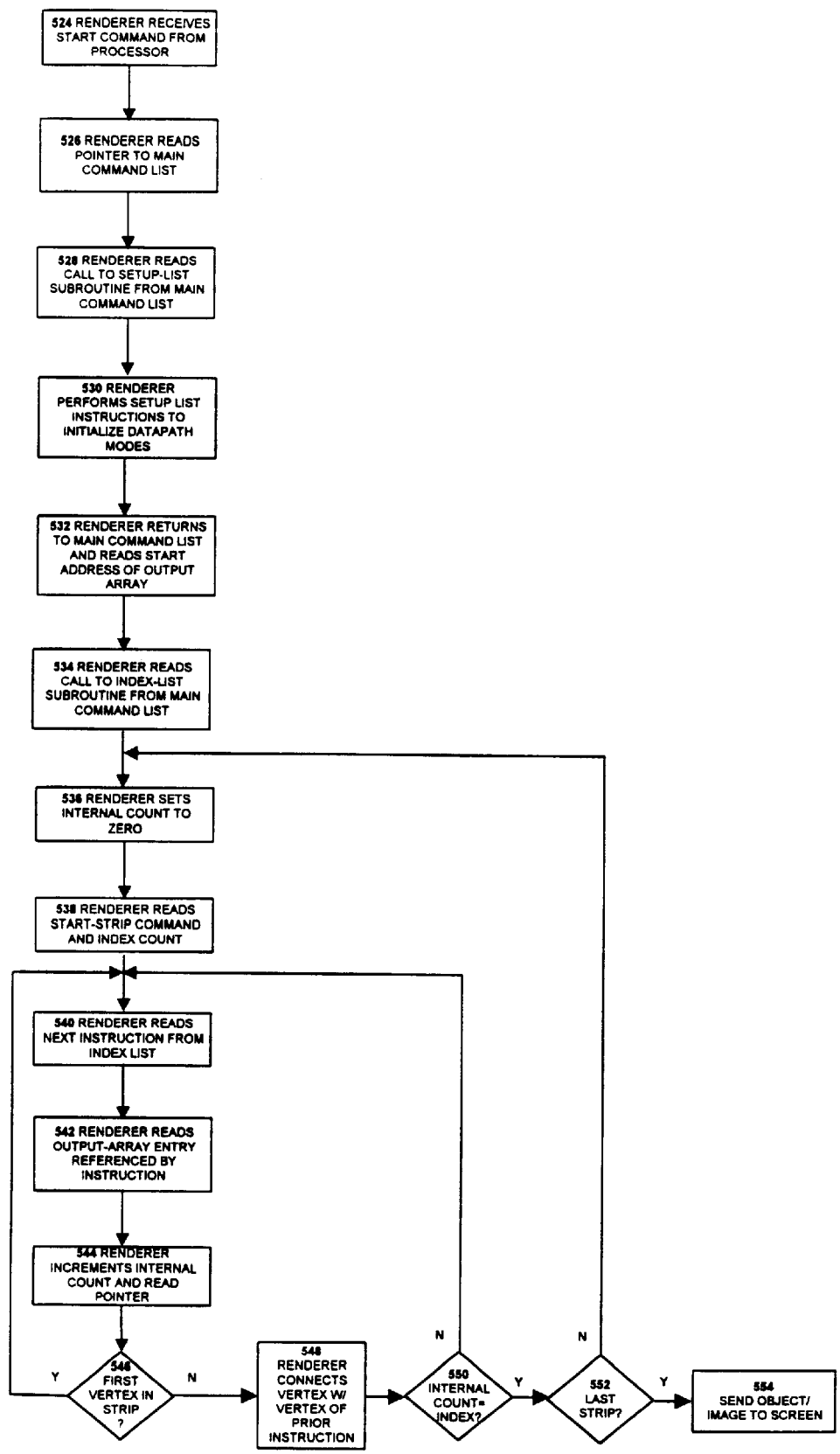

FIG. 5B shows a flow diagram of the role of renderer 430 in a method for rendering a three-dimensional graphical image in accordance with the present invention. Renderer 430 receives the start command from processor 420 in step 524 and reads in step 526 pointer 467 placed in a register by processor 420 in step 526. The pointer references main command list 413, from which renderer 430 reads the call to setup list 414 in step 528. In step 530, the renderer performs the setup list instructions to initialize the datapath modes. In step 532, the renderer returns to the main command list and reads the start address of output array 412. In step 534, the renderer reads the call to index list 220. In step 536, the renderer sets an internal count register to zero. The count register is used to track the number of processed index instructions and to determine when a strip is finished by comparing the count with the index count supplied in the "start strip"command. This command and the index count are read by the renderer in step 538.

In step 540, the renderer begins the actual rendering of a strip by reading the first index instruction from index list 220. This instruction stores an offset value that, once added to the starting address of output array 412, references the parameters of a transformed vertex of a triangle that is used to render the object to be depicted. The renderer reads in step 542 the vertex parameters stored in the referenced entry of output array 412. It is noted that the instruction contains a reference to the transformed coordinates of one vertex. Whether the vertex may be connected to the preceding vertex of the strip depends upon whether the vertex is the first in a strip. It is noted that the index instructions of index list 220 do not necessarily instruct the renderer to read the output-array entries sequentially. In step 544, the renderer increments the internal count register discussed above. In step 546, it is determined whether the referenced vertex is the first in a strip. If it is determined that the referenced vertex is the first in a strip, it is necessary to fetch a second vertex from the output array in steps 540 and 542, since step 548 requires two vertices to connect. In step 548, renderer 430 connects the two vertices and partially assembles the triangle. In step 550, renderer 430 determines whether the last instruction in the strip has been processed by comparing the internal count register to the index count. If not, the process continues at step 540 and renderer 430 repeats steps 540 through 550 for the next index instruction in index list 220. Once the last instruction has been processed, the strip has been completely transformed and assembled. In step 552, the renderer determines whether the last strip in the object has been processed. If not, steps 536 through 552 are repeated for the next strip. Notably, processor 420 need not transform and light the vertices for the next strip, since the transformations are stored in output array 412. Once the last strip has been assembled, the object is projected on screen 440 in step 554.

The above system and method reduce the three inefficiencies identified in the prior art. With respect to (1) the number of computation cycles required of the processor is reduced because each vertex is transformed and lighted only once per rendering. Thus redundant processing is reduced. With respect to (2) the assembled triangles are not stored and therefore the memory requirements are reduced. With respect to (3) the memory bandwidth of the system is more efficiently used, since data redundancy has been minimized and since the data sent from one element to another has been atomized.

We claim:

1. A method for arranging graphical data stored as an array of vertices and a list of indices, comprising:
    generating an output array, further comprising for each output-array entry:
        selecting a corresponding vertex from the array of vertices;
        transforming the vertex; and
        storing the transformed vertex in the output-array entry;
    reading a first index from the list of indices;
    reading from the output array a first transformed vertex referenced by the first index;
    reading a second index from the list of indices;
    reading from the output array a second transformed vertex referenced by the second index; and
    associating the second transformed vertex with the first transformed vertex.

2. The method of claim 1, wherein the step of transforming further comprises transforming the spatial coordinates of the vertex into the screen coordinates of a transformed vertex.

3. The method of claim 1, further comprising rendering the association between the first transformed vertex and the second transformed vertex as a line.

4. The method of claim 1, wherein the array of vertices stores the spatial coordinates of a set of vertices arrayed upon the surface of an object.

5. The method of claim 1, wherein the list of indices stores the connections between a set of vertices arrayed upon the surface of an object.

6. The method of claim 5, wherein the indices of the list of indices are arranged in the order of strips arrayed upon the surface of an object.

7. A system for rendering an image stored as an array of vertices and a list if indices, comprising:
    a geometry processor for transforming each vertex in the array of vertices;
    an output array for storing each transformed vertex generated by the geometry processor;
    a renderer for associating pairs of transformed vertices in accordance with the list of indices.

8. The system of claim 7, wherein the geometry processor is for transforming the spatial coordinates of each vertex in the array of vertices into screen coordinates.

9. The system of claim 7 further comprising a screen for rendering the association between a pair of transformed vertices as a line.

10. The system of claim 7, wherein the array of vertices stores the spatial coordinates of a set of vertices arrayed upon the surface of an object.

11. The system of claim 7, wherein list of indices stores the connections between a set of vertices arrayed upon the surface of an object.

12. The system of claim 11, wherein the indices of the list of indices are arranged in the order of strips arrayed upon the surface of an object.

* * * * *